United States Patent
Nugent

(10) Patent No.: US 8,918,353 B2
(45) Date of Patent: Dec. 23, 2014

(54) METHODS AND SYSTEMS FOR FEATURE EXTRACTION

(75) Inventor: Alex Nugent, Santa Fe, NM (US)

(73) Assignee: KnowmTech, LLC, Albuquerque, NM (US)

( * ) Notice: Subject to any disclaimer, the term of this patent is extended or adjusted under 35 U.S.C. 154(b) by 256 days.

(21) Appl. No.: 13/595,158

(22) Filed: Aug. 27, 2012

(65) Prior Publication Data

US 2013/0218815 A1  Aug. 22, 2013

Related U.S. Application Data

(60) Provisional application No. 61/601,633, filed on Feb. 22, 2012.

(51) Int. Cl.
- G06F 15/18 (2006.01)
- G06N 3/08 (2006.01)
- G06N 99/00 (2010.01)
- G06N 5/02 (2006.01)

(52) U.S. Cl.
CPC .............. *G06N 99/005* (2013.01); *G06N 5/025* (2013.01)
USPC ......................................................... 706/25

(58) Field of Classification Search
None
See application file for complete search history.

(56) References Cited

U.S. PATENT DOCUMENTS

| | | | |
|---|---|---|---|
| 5,680,481 A | 10/1997 | Prasad et al. | |
| 5,794,224 A | 8/1998 | Yufik | |
| 6,308,155 B1 | 10/2001 | Kingsbury et al. | |
| 6,889,216 B2 | 5/2005 | Nugent | |
| 6,910,010 B2 | 6/2005 | Iwahashi et al. | |
| 6,995,649 B2 | 2/2006 | Nugent | |
| 7,028,017 B2 | 4/2006 | Nugent | |
| 7,039,619 B2 | 5/2006 | Nugent | |
| 7,082,394 B2 | 7/2006 | Burges et al. | |
| 7,107,252 B2 | 9/2006 | Nugent | |
| 7,392,230 B2 | 6/2008 | Nugent | |
| 7,398,259 B2 | 7/2008 | Nugent | |

(Continued)

FOREIGN PATENT DOCUMENTS

EP  1 483 737 B1  3/2011

OTHER PUBLICATIONS

Nugent et al. Reliable computing with unreliable components: Using separable environments to stabilize long-term information storage, 2008, Physica D, pp. 1196-1206.*

Johansson et al. "Attractor Memory with Self-organizing Input", BioADIT 2005, LNCS 3853, pp. 265-280.*

Bag, S. et al., "Topographic Feature Extraction for Bengali and Hindi Character Images," Signal & Image Processing: An International Journal (2011) 2(2):181-196.

(Continued)

*Primary Examiner* — Li-Wu Chang
(74) *Attorney, Agent, or Firm* — Kermit D. Lopez; Luis M. Ortiz; Ortiz & Lopez, PLLC

(57) ABSTRACT

A method and system for extracting feature utilizing an AHaH module (Anti-Hebbian and Hebbian). A sparse input data stream can be presented to a synaptic matrix of a collection of AHaH nodes associated with the AHaH module. The AHaH module operates an AHaH plasticity rule via an evaluate phase and a feedback phase cycle. A bias input line can be modulated such that a bias weight do not receive a Hebbian portion of the weight update during the feedback phase in order to prevent occupation of a null state. The input space can be bifurcated when the AHaH nodes fall randomly into an attractor state. The output of the AHaH module that forms a stable bit pattern can then be provided as an input to a content-addressable memory for generating a maximally efficient binary label.

20 Claims, 10 Drawing Sheets

(56) References Cited

U.S. PATENT DOCUMENTS

| | | |
|---|---|---|
| 7,409,375 B2 | 8/2008 | Nugent |
| 7,412,428 B2 | 8/2008 | Nugent |
| 7,420,396 B2 | 9/2008 | Nugent |
| 7,426,501 B2 | 9/2008 | Nugent |
| 7,502,769 B2 | 3/2009 | Nugent |
| 7,599,895 B2 | 10/2009 | Nugent |
| 7,681,245 B2 | 3/2010 | Walker et al. |
| 7,752,151 B2 | 7/2010 | Nugent |
| 7,827,130 B2 | 11/2010 | Nugent |
| 7,827,131 B2 | 11/2010 | Nugent |
| 7,853,049 B2 | 12/2010 | Lee et al. |
| 7,930,257 B2 | 4/2011 | Nugent |
| 8,022,732 B2 | 9/2011 | Nugent |
| 8,041,653 B2 | 10/2011 | Nugent |
| 8,103,102 B2 | 1/2012 | Chien et al. |
| 2005/0215239 A1 | 9/2005 | Kopra et al. |
| 2006/0136411 A1 | 6/2006 | Meyerzon et al. |
| 2011/0145179 A1 | 6/2011 | Nugent |

OTHER PUBLICATIONS

Imtiaz, H. et al., "A Face Recognition Scheme Using Wavelet-Based Dominant Features," Signal & Image Processing: An International Journal (2011) 2(3):69-80.

Pobitzer, A. et al., "Energy-scale Aware Feature Extraction for Flow Visualization," Eurographics/IEEE Symposium on Visualization 2011 (EuroVis 2011) 30(3):771-780.

Yufik, Y. M., "Virtual Associative Networks: A Framework for Cognitive Modeling," Brian and Values: Is a Biological Science of Values Possible (1998) Lawrence Erlbaum Associates, Inc., Pribram, K. H. (ed.), Mahway, NJ, pp. 109-177.

Yufik, Y. M. et al., "Swiss Army Knife and Ockham's Razor: Modeling and Facilitating Operator's Comprehension in Complex Dynamic Tasks," IEEE Transactions on Systems, Man, and Cybernetics—Part A: Systems and Humans (2002) 32(2):185-199.

Yufik, Y. M., "How the Mind Works: An Exercise in Pragmatism," Inst. Of Med. Cybern. Inc. (2002) Gaithersburg, MD, 5 pages.

* cited by examiner

METHODS AND SYSTEMS FOR FEATURE EXTRACTION

CROSS-REFERENCE TO PROVISIONAL APPLICATION

This application claims priority under 35 U.S.C. 119(e) to U.S. Provisional Patent Application Ser. No. 61/601,633, entitled "Methods and Systems for Feature Extraction," which was filed on Feb. 22, 2012, the disclosure of which is incorporated herein by reference in its entirety.

STATEMENT OF GOVERNMENT RIGHTS

The United States Government has certain rights in this invention pursuant to Contract No. FA8750-11-C-0111 awarded by the Air Force Research Laboratory/RITC.

TECHNICAL FIELD

Embodiments are generally related to machine learning and AI (Artificial Intelligence). Embodiments are also related to feature extraction techniques and applications thereof.

BACKGROUND OF THE INVENTION

Machine learning can be employed to construct a model or rule set to predict a result based on values with respect to a number of features. A series of input patterns can be provided to an algorithm along with a desired output (e.g., the label) and the algorithm then learns how to classify the patterns by outing a desired label. In supervised learning (e.g., Kernal-based support vector machine (SVM) algorithm), a human operator must provide the labels during a teaching phase. Alternatively, unsupervised clustering is a process of assigning labels to the input patterns without the use of the human operator. Such unsupervised methods generally function through a statistical analysis of the input data by determining an Eigen value vector of a covariance matrix.

The majority of prior art machine learning approaches utilize many patterns or exemplars for learning. The variables that encode the algorithms learning behavior can be modified during a learning stage and tested for accuracy and generalization during a testing phase. Without sufficient examples, determining a solution that balances memorization with generalization is often difficult due to separation of the training and testing stage. Also, it is difficult or impossible to determine an appropriate variable configuration leading to an optimal point during the learning stage.

A modern solution to the memorization vs. generalization problem involves the mathematical technique of support-vector-maximization. The input patterns can be projected into a high-dimensional and linearly separable space and a linear classifier can then be employed to label the data in binary classification. The linear classifier represents a hyperplane (e.g., a decision boundary) in a high-dimensional space. All inputs falling on one side of the decision boundary result in a positive output, while all inputs on the other side result in a negative output. The support-vectors are the distances from the closest input points to the decision boundary and the process of maximizing the distance is support-vector-maximization. The problem associated with such an approach is that identifying the support-vectors without sufficient examples requires extensive testing of a number of input patterns to determine which input is closest to the decision boundary.

Another problem associated with machine learning is adaptation to non-stationary statistics, which can occur as the statistic of the underlying data varies with time. Also, determining statistical regularities in large quantities of streaming information can be incredibly power intensive as the problem encounters combinatorial explosions. The complexity of the task is echoed in a biological nervous system, which are essential communication networks that self-evolve to detect and act on regularities present in the input data stream.

Based on the foregoing, it is believed that a need exists for an improved machine learning system and method. A need also exists for an improved method for extracting feature with respect to an input data stream, as described in greater detail herein.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for improved machine learning method and system.

It is another aspect of the disclosed embodiments to provide for an improved method and system for extracting feature utilizing an AHaH (Anti-Hebbian and Hebbian) module and/or AHaH nodes.

It is a further aspect of the disclosed embodiments to provide for improved methods and systems for generating a low dimensional and noise-free label space from a high-dimension and noisy input space.

It is yet another aspect of the disclosed embodiments to provide for improved methods and systems for converting noisy sparse input patterns into low-noise binary patterns such that exact bit matching may be performed.

The aforementioned aspects and other objectives and advantages can now be achieved as described herein. Methods and systems for extracting features utilizing an AHaH (Anti-Hebbian and Hebbian) module are disclosed herein. An input data stream (e.g., a sparse input data stream) can be presented to a synaptic matrix of a collection of AHaH nodes associated with the AHaH module. The AHaH node operates an AHaH plasticity rule via an evaluate phase and a feedback phase cycle. A bias input line can be modulated such that a bias weight do not receive a Hebbian portion of the weight update during the feedback phase in order to prevent occupation of a null state. The input space can be bifurcated when the AHaH nodes fall randomly into an attractor state. The output of the AHaH module that forms a stable bit pattern can then be provided as an input to a content-addressable memory (CAM), Least-Recently Used Cache (LRUC), Least Frequently Used Cache (LFUC), Adaptive Cache, or other methods for dimensionality reduction of binary vectors.

An AHaH node is a collection of synapses and associated Complementary Metal-Oxide-Semiconductor (CMOS) feedback circuitry acting on at least one of three possible electrode configurations: 1-2, 2-1, or 2-2. For example, a synapse is a differential pair of memristors between two output electrodes and one input electrode, which is the 1-2 configuration. Each node can be represented as a voltage divider operating over the space of its active inputs prior to application of a feedback voltage. During the evaluate phase, an input voltage can be applied to select inputs and the voltage can be integrated via the differential synapses on the nodes electrode. During the "read" phase, each synapse undergoes negative feedback. During the feedback phase, positive feedback can be applied to either the pre- or post-synaptic electrode via a voltage-keeper circuit while the post- or pre-synaptic electrode potential is reversed. This is known as the Flip-Lock Cycle and it is used to apply positive feedback to the synaptic states. Thus, the AHaH rule can be understood as a two-part procedure of state evaluation that results in negative feedback to the synaptic state (Anti-Hebbian Learning) followed by state reinforcement that results in positive feedback to the synaptic state (Hebbian learning). Such procedures are detailed in, for example, U.S. Pat. No. 7,599,895, which is incorporated herein by reference.

A synaptic normalization can be performed to decay the memristors in order to operate them within their dynamic range and to prevent saturation over time. The frequency of synaptic renormalization can be reduced as the dynamic range of the memristors increases. Depending on the physical attributes of the memristive devices used to construct the synapses, a number of techniques may be used. For example, if it is the case that a reverse bias will reduce the conductance of the devices, such a bias may be applied to speed up decay and hence synaptic normalization. Alternately, if the memristive devices are inherently volatile, it may be the case that a period of sleep or rest is sufficient to provide the necessary decay required for re-normalization of the differential synapses. This is the lowest-energy solution, although it requires extended periods of inactivity akin to sleep. In the case of memristive devices formed of colloidal particles, increased driving frequency may cause the transition from positive-Dielectrophoretic (attractive) to negative-Dielectrophoretic (repulsive) forces, thus speeding up decay.

The AHaH nodes perform spatial pooling of the input lines into temporally independent components (IC), collapsing the large input space and outputting the stable binary labels for input features regardless of the number of input lines that carry the data. Each temporally correlated group of inputs forms independent components and the AHaH rule binds these inputs together by assigning them synapses of similar sign. Once each AHaH node has settled into unique attractor states, the collective can output the binary label for each input feature, converting large, sparse, incomplete, noisy patterns into small, complete, noise-free binary patterns.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

Figure 1:
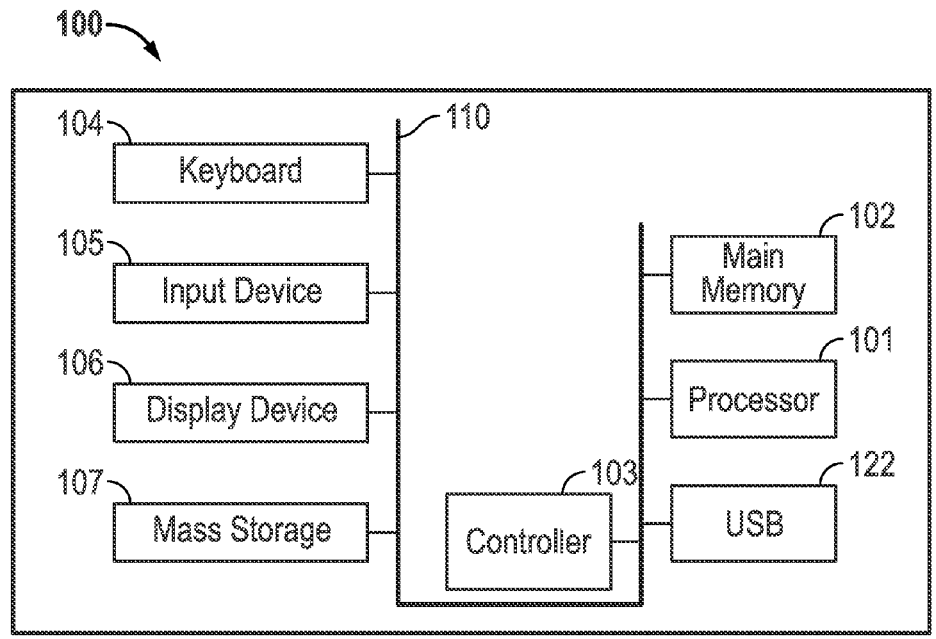
FIG. 1 illustrates a schematic view of a computer system, in accordance with the disclosed embodiments.

The particular values and configurations discussed in these non-limiting examples can be varied and are cited merely to illustrate at least one embodiment and are not intended to limit the scope thereof.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of a general-purpose computer, special purpose computer, or other programmable data processing apparatus to produce a machine such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner such that the instructions stored in the computer-readable memory produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Figure 2:
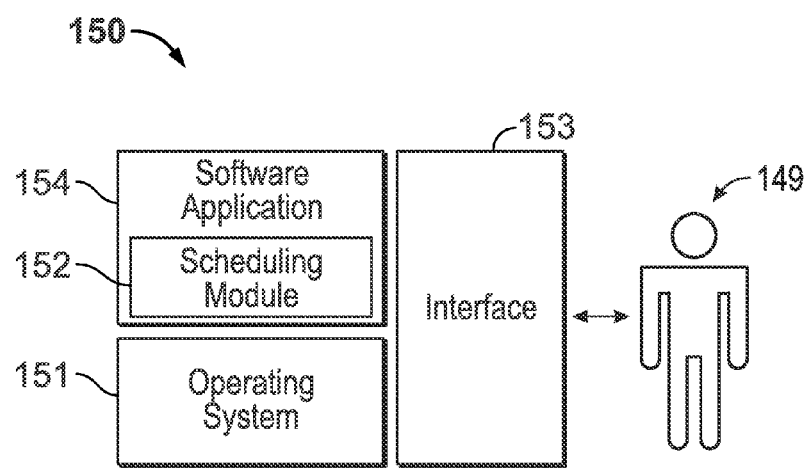
FIG. 2 illustrates a schematic view of a software system including a feature extraction module, an operating system, and a user interface, in accordance with the disclosed embodiments.

FIGS. 1-2 are provided as exemplary diagrams of data-processing environments in which embodiments may be implemented. It should be appreciated that FIGS. 1-2 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 1, the disclosed embodiments may be implemented in the context of a data-processing system 100 that includes, for example, a processor 101, a main memory 102, a controller 103, an input device 105 (e.g., keyboard, touchscreen input, a pointing device such as a mouse, track ball, pen device, etc.), a display device 106, mass storage 107 (e.g., a hard disk), and in some embodiments a USB (Universal Serial Bus) peripheral connection 122. As illustrated, the various components of data-processing system 100 can communicate electronically through a system bus 110 or similar architecture. The system bus 110 may be, for example, a subsystem that transfers data between, for example, computer components within data-processing system 100 or to and from other data-processing devices, components, computers, etc.

FIG. 2 illustrates a computer software system 150 for directing the operation of the data-processing system 100 depicted in FIG. 1. Software application 154, stored in main memory 102 and/or in mass storage 107, generally includes a kernel or operating system 151 and a shell or interface 153. One or more application programs, such as software application 154, may be "loaded" (i.e., transferred from mass storage 107 into the main memory 102) for execution by the data-processing system 100. The data-processing system 100 receives user commands and data through user interface 153; these inputs may then be acted upon by the data-processing system 100 in accordance with instructions from operating system module 151 and/or software application 154. In some embodiments, the software application 154 can include a module 152 (e.g., software, instructions, etc.) that performs, for example, feature extraction instructions as discussed in greater detail herein The following discussion is intended to provide a brief, general description of suitable computing environments in which the system and method may be implemented. Although not required, the disclosed embodiments will be described in the general context of computer-executable instructions such as program modules being executed by a single computer. In most instances, a "module" constitutes a software application.

Generally, program modules include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations such as, for example, hand-held devices, multi-processor systems, data networks, microprocessor-based or programmable consumer electronics, networked personal computers, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines, and an implementation, which is typically private (accessible only to that module) and which includes source code that actually implements the routines in the module. The term module may also simply refer to an application such as a computer program designed to assist in the performance of a specific task such as word processing, accounting, inventory management, etc. In some cases, the module may be hardware, software or a combination thereof.

The interface 153, which is preferably a graphical user interface (GUI), can serve to display results, whereupon a user may supply additional inputs or terminate a particular session. In some embodiments, operating system 151 and interface 153 can be implemented in the context of a "windows" system. It can be appreciated, of course, that other types of systems are possible. For example, rather than a traditional "windows" system, other operation systems such as, for example, a real time operating system (RTOS) more commonly employed in wireless systems may also be employed with respect to operating system 151 and interface 153. The software application 154 can include, for example, a feature extraction module 152 for extracting feature. The feature extraction module 152 can include instructions such as those, for example, of method 300 discussed herein with respect to FIG. 4.

FIGS. 1-2 are thus intended as examples and not as architectural limitations of disclosed embodiments. Additionally, such embodiments are not limited to any particular application or computing or data processing environment. Instead, those skilled in the art will appreciate that the disclosed approach may be advantageously applied to a variety of systems and application software. Moreover, the disclosed embodiments can be embodied on a variety of different computing platforms including Macintosh, Unix, Linux, and the like.

Figure 3:
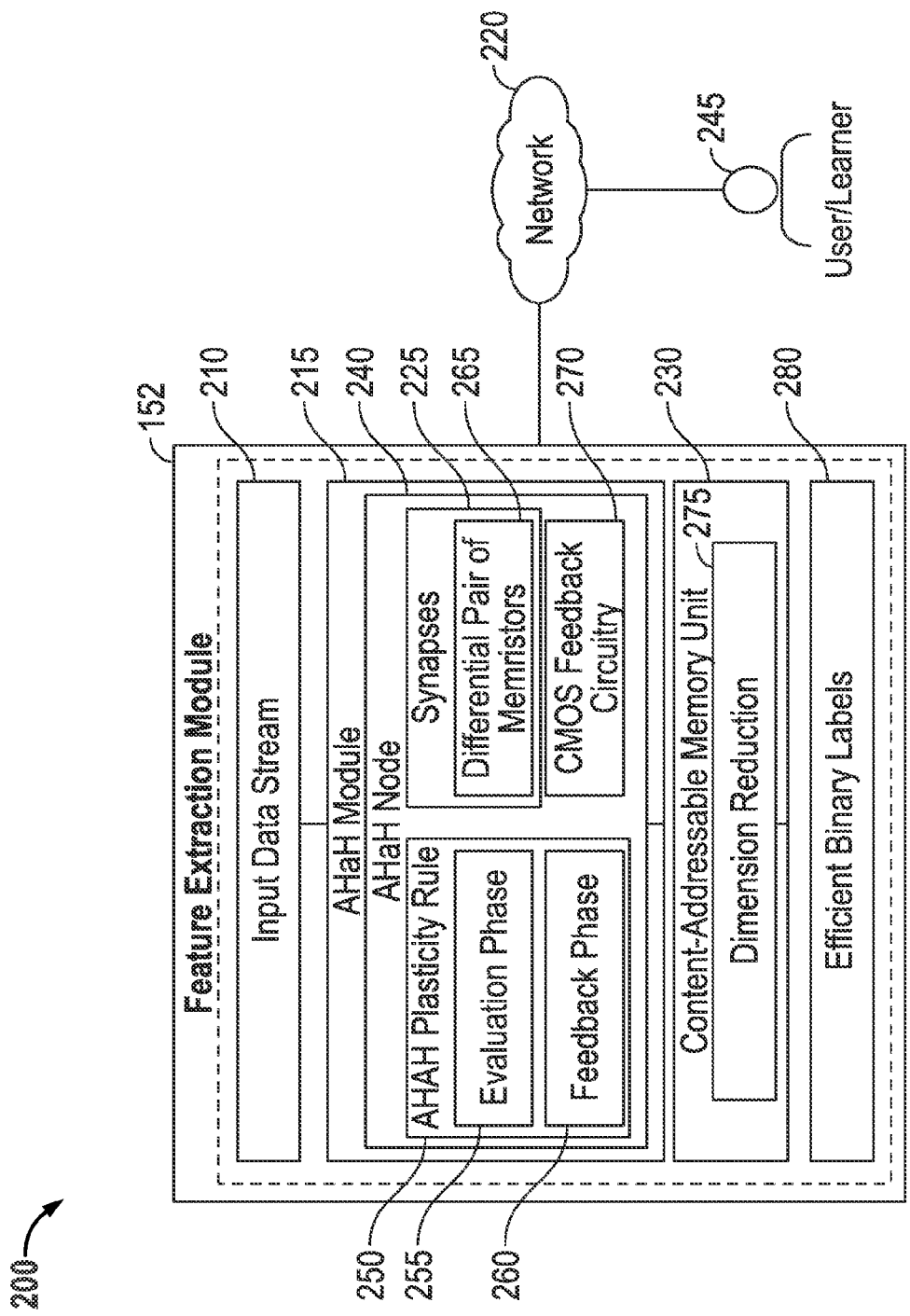
FIG. 3 illustrates a block diagram of a feature extraction system, in accordance with the disclosed embodiments.

FIG. 3 illustrates a block diagram of a feature extraction system 200, in accordance with the disclosed embodiments. Note that in FIGS. 1-15, identical or similar blocks are generally indicated by identical reference numerals. The feature extraction system 200 generally includes the feature extraction module 152 connected to a network 220. Note that the network 220 may employ any network topology, transmission medium, or network protocol. The network 220 may include connections such as wire, wireless communication links, or fiber optic cables. Network 220 can also be an Internet representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, government, educational, and other computer systems that route data and messages.

The feature extraction module 152 can be configured to include the AHaH (Anti-Hebbian and Hebbian) module 215 that includes an AHaH node 240. The AHaH node operates an AHaH plasticity rule 250 via an evaluate phase 255 and a feedback phase cycle 260. The AHaH node 240 represents a collection of synapses 225 and associated complementary metal-oxide-semiconductor (CMOS) feedback circuitry 270 acting on at least one electrode configurations. A large and likely sparse input data stream 210 can be presented to the synaptic matrix 225 with respect to the AHaH module 215. The synapse 225 is a differential pair of memristors 265 between two output electrodes and one input electrode. Note that the acronym AHaH can be utilized interchangeably with the acronym AHAH to refer to the same feature (i.e., Anti-Hebbian and Hebbian).

In general, Hebbian theory is a scientific theory in biological neuroscience, which explains the adaptation of neurons in the brain during the learning process. It describes a basic mechanism for synaptic plasticity wherein an increase in synaptic efficacy arises from the presynaptic cell's repeated and persistent stimulation of the postsynaptic cell. In neuroethology and the study of learning, anti-Hebbian learning describes a particular class of learning rule by which synaptic plasticity can be controlled. These rules are based on a reversal of Hebb's postulate, and therefore can be simplistically understood as dictating reduction of the strength of synaptic connectivity between neurons following a scenario in which a neuron directly contributes to production of an action potential in another neuron.

During the evaluate phase 255, an input voltage can be applied and the voltage can be integrated via the differential synapses 225 on the nodes electrode and each synapse 225 undergoes negative feedback. During the feedback phase 260, a positive feedback can be applied to the electrode via a voltage-keeper circuit and the synapse 225 undergoes an update which is opposite in direction to that which is received during the evaluation phase 255 and it proceeds for a variable time. A bias input line can be modulated such that bias weights do not receive a Hebbian portion of the weight update in order to prevent occupation of a null state during the feedback phase 260. The input space can be partitioned when a collection of the AHaH nodes 240 fall randomly into many attractor states.

A synaptic normalization can be performed to decay the memristors 265 in order to operate them within their dynamic range and to prevent saturation over time. The frequency of synaptic renormalization can be reduced as the dynamic range of the memristors 265 increases. The AHaH plasticity rule 250 transitions from Anti-Hebbian to Hebbian learning as a function of a feedback parameter governing the amount of positive feedback or Hebbian learning.

The Hebbian portion of the update must decrease in magnitude or transition to the Anti-Hebbian as the magnitude of the post-synaptic activation becomes large. The AHaH node 240 bifurcates the input space 210 as cleanly as possible and a collective of AHaH nodes 240 each occupying distinct attractor states can distinguish features. If the input pattern 210 falls on one side of the decision boundary, the output of the AHaH node 240 is positive, while it is negative if it is on the other side of the boundary. The output AHaH node 240 is an efficient binary encoding representing one natural independent component of the input data distribution.

The core operation of a collection of AHaH nodes 240 is spatial pooling of input lines into temporally independent components (IC), collapsing the large input space, and outputting stable binary labels for input features. Each temporally correlated group of inputs forms independent components (IC) and the AHaH rule 250 binds these inputs together by assigning them synapses 225 of the same sign. Once each AHaH node 240 has settled into unique attractor states, the collective can output a binary label for each input feature, converting large, sparse, incomplete, noisy patterns into small, complete, noise-free binary patterns.

The output of the AHaH module 215 that forms a stable bit pattern can then be provided as an input to a content-addressable memory 230 for further reduction of dimensionality. In general, content-addressable memory (CAM) is a special type of computer memory used in certain very high speed searching applications. It is also known as associative memory, associative storage, or associative array. The maximally efficient binary labels 280 for regularities present in the input to the AHaH module 215 can be generated as output by the content-addressable memory 230. Other methods for dimensionality reduction of binary vectors exist, for example, Least-Recently Used Cache (LRUC), Least Frequently Used Cache (LFUC), Adaptive Caches, etc. In each case, the problem is simply one of taking a small number of binary vectors existing in a higher dimensional space (128 32-bit vectors, for example) and reducing this to a maximally efficient binary encoding (128 7-bit vectors).

Figure 4:
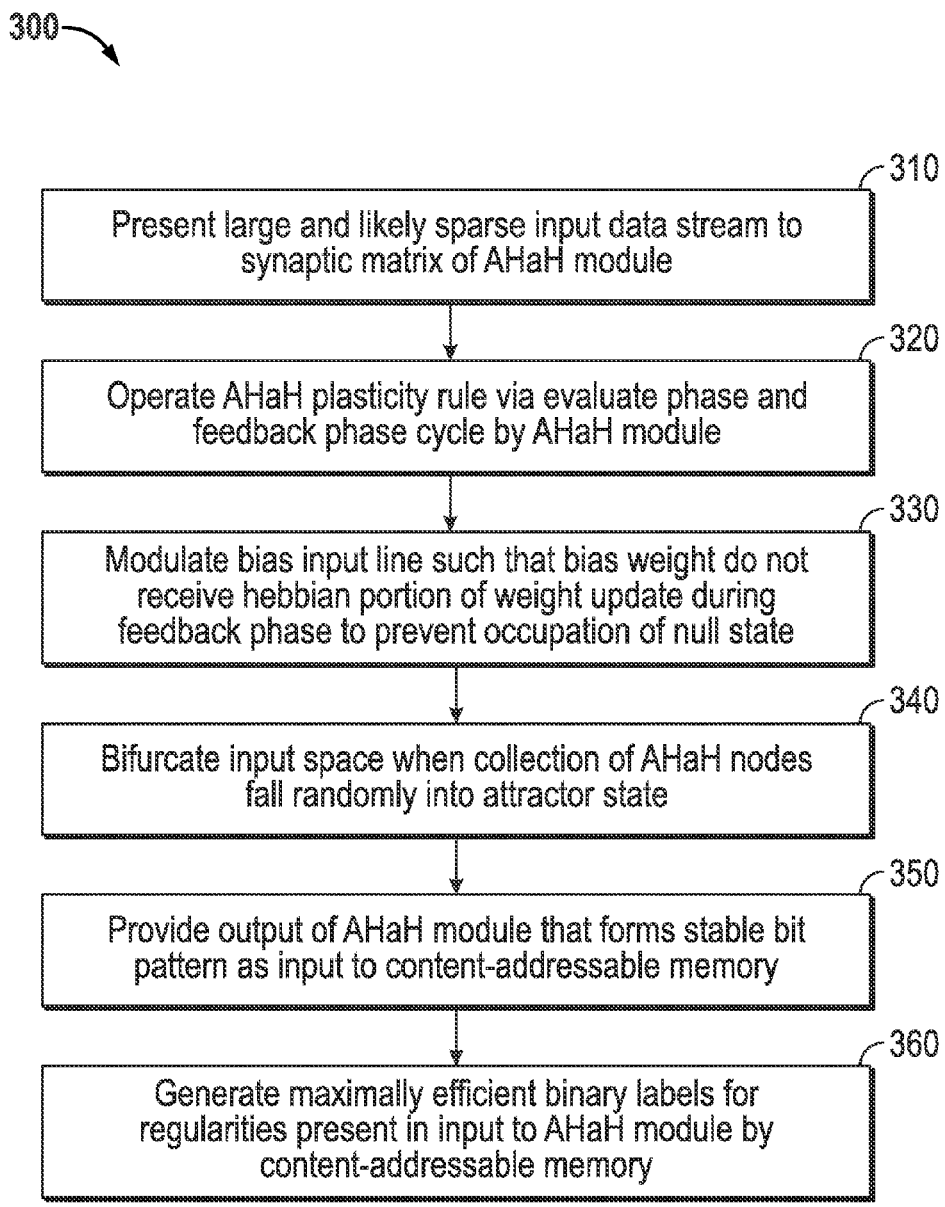
FIG. 4 illustrates a high level flow chart of operations illustrating logical operational steps of a method for extracting feature utilizing an AHaH module (Anti-Hebbian and Hebbian), in accordance with the disclosed embodiments.

FIG. 4 illustrates a high level flow chart of operations illustrating logical operational steps of a method 300 for extracting features utilizing the AHaH module 152, in accordance with the disclosed embodiments. It can be appreciated that the logical operational steps shown in FIG. 4 can be implemented or provided via, for example, a module such as module 154 shown in FIG. 1 and can be processed via a processor such as, for example, the processor 101 shown in FIG. 1. Initially, the large and likely sparse input stream 210 can be presented to the synaptic matrix 225 with respect to the AHaH module 215, as indicated at block 310. Thereafter, as illustrated at block 320, the AHaH module 215 operates the AHaH plasticity rule 250 via the evaluate phase 255 and the feedback phase cycle 260. A bias input line can be modulated such that a bias weight do not receive a Hebbian portion of the weight update during the feedback phase 260 in order to prevent occupation of a null state, as shown at block 330.

Next, the input space can be bifurcated when a collection of the AHaH nodes 240 fall randomly into an attractor state, as indicated at block 340. The output of the AHaH module 152 that forms a stable bit pattern can then be provided as an input to the content-addressable memory 230 for further reduction of dimensionality 275, as depicted at block 350. The maximally efficient binary labels 280 for regularities present in the input to the AHaH module 152 can be generated as output by the content-addressable memory 230, as shown at block 360.

Figure 5:
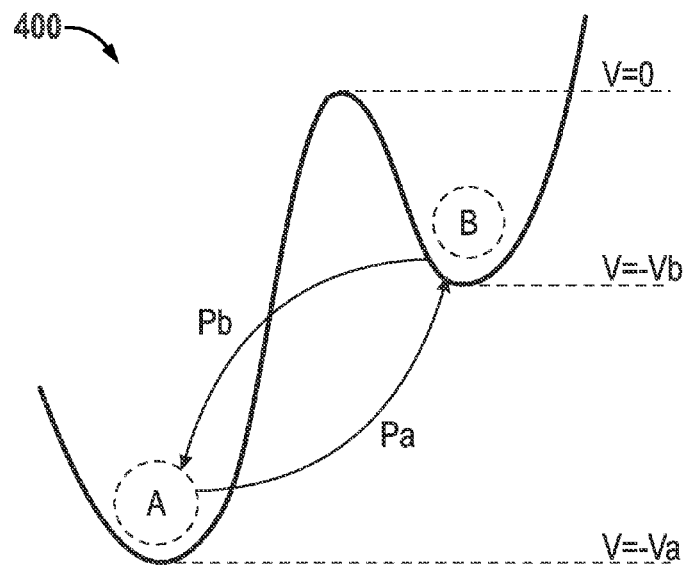
FIG. 5 illustrates a graph depicting a meta-stable switch, in accordance with the disclosed embodiments.

FIG. 5 illustrates a graph 400 depicting a meta-stable switch, in accordance with the disclosed embodiments. The memristor 265 is a collection of meta-stable switches (MSS). Each MSS possess two states, A and B, separated by a potential energy barrier as shown in FIG. 5. The barrier potential can be set as the reference potential V=0. The probability that the MSS can transition from the A state to the B state is given by $P_A$, while the probability that the MSS will transition from the B state to the A state is given by $P_B$. The transition probabilities $[P_A, P_B]$ can be modeled as shown below in equation (1):

$$P_A = \alpha \frac{1}{1+e^{-\beta(\Delta V - V_A)}} = \alpha \Gamma(\Delta V, V_A) \quad (1)$$

$$P_B = \alpha(1 - \Gamma(\Delta V, -V_B))$$

where $$\beta = \frac{q}{kT}$$

represents the thermal voltage and is equal to 26 mV$^{-1}$, $$\frac{\Delta t}{t_c}$$

represents the ratio of the time step period $\Delta t$ to the characteristic time scale of the device $t_c$ and $\Delta V$ represents the voltage across the device. $P_A$ can be defined as the positive-going direction so that a positive applied voltage increases the chances of occupying the B state. Each state possess an intrinsic electrical conductance provided by $w_A$ and $w_B$. The MSS possess utility in an electrical circuit as a memory or adaptive computational element so long as these conductances are different. The convention can be assumed $w_b \geq w_a$. The memristor conductance is provided by the sum over each meta-stable switch as illustrated below in equation (2):

$$W_m = N_A w_A + N_B w_B = N_B(w_B - w_A) + N w_A \quad (2)$$

where $N_A$ represents the number of MSS's in the A state, $N_B$ represents the number of MSS's in the B state and $N = N_A + N_B$. At each time step some sub-population of the MSSs in the A state will transition to the B state, while some sub-population in the B state will transition to the A state. The probability that k switches can transition out of a population of n switches given a probability of p is given by the binomial distribution as shown in equation (3):

$$P(n, k) = \frac{n!}{k!(n-l)!} p^k (1-p)^{n-k} \quad (3)$$

As n becomes large the binomial distribution can be approximated with a normal distribution as shown below in equation (4):

$$G(\mu, \sigma^2) = \frac{1}{\sqrt{2\pi\sigma^2}} e^{\frac{-(x-\mu)^2}{2\sigma^2}} \quad (4)$$

where $\mu = np$ and $\sigma^2 = np(1-p)$. The change in conductance of the memristor 265 is a probabilistic process since the memristor 265 is composed of discrete meta-stable switches. Using the approximation above, the number of MSSs that transition between A and B states can be picked from a normal distribution with a center at np and variance np(1−p), where the state transition probabilities can be provided as above. The update to the memristor conductance is thus given by the contribution from two random variables picked from two normal distributions as illustrated in equation (5):

$$\Delta N_B = G(N_A P_A, N_A P_A(1-P_A)) - G(N_B P_B, N_B P_B(1-P_B)) \quad (5)$$

The update to the conductance of the memristor 265 is then given by:

$$\Delta w_m = \Delta N_B(w_B - w_A) \quad (6)$$

The memristor 265 can be initialized into a non-equilibrium state such as $N_B = N$ or $N_B = 0$ in order to measure the characteristic timescale of the device and then measure the decay back to an equilibrium conductance period under zero bias.

Figure 6:
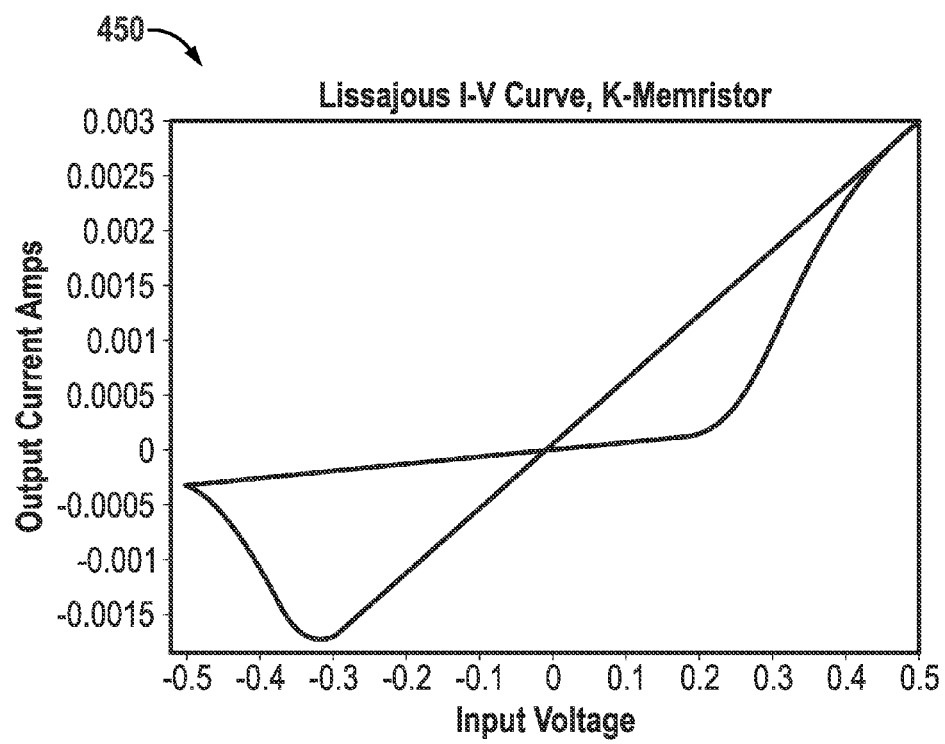
FIG. 6 illustrates a plot of a hysteresis loop of a memristor devices, in accordance with the disclosed embodiments.

FIG. 6 illustrates a graphical representation 450 of a hysteresis loop of memristor 265, in accordance with the disclosed embodiments. This is also known as a Lissajous I-V Curve and it demonstrates the intrinsic memory of the meta-stable switch collective. The memristor 265 is intrinsically a stochastic element, although if composed of many MSS's it may appear to be continuous. Depending on the relative values of $V_A$ and $V_B$ the device can display a range of characteristics. The property of decay and a non-conducting ground state can be achieved under the conditions $V_B < V_A, V_A \Rightarrow kTlq$ and $w_B > w_A$. The utility of the memristor 265 lies in its ability to change its conductance as a function of the voltage applied. This can be illustrated by a Lissajous I-V curve 450, which shows how the conductance of the memristor 265 changes over time as a sinusoidal voltage is applied. The core device element of the self-organizing unit or node 240 is thus the meta-stable switch and the memristor 265 can be seen as a device composed of meta-stable switches.

Figure 7:
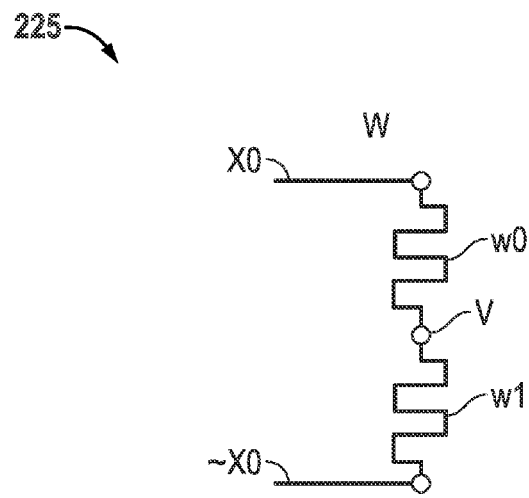
FIG. 7 illustrates a schematic view of a synapse, in accordance with the disclosed embodiments.

FIG. 7 illustrates a schematic view of the synapse 225, in accordance with the disclosed embodiments. The synapse 225 is a differential pair of memristors 265: $W = w_o - w_1$, where W denotes the difference in conductance between the two memristors 265 composing the synapse 225. FIG. 7 includes three possible configurations: 2-1, 1-2, and 2-2, which refer to the number of input and output electrodes on the synapse 225.

The probability that the meta-stable switch will transition from its ground state to excited state is a function of the applied voltage and time it is applied. The function can be approximated as quadratic in voltage and linear in time as shown in equation (7):

$$P(E_0 \rightarrow E_1) \approx \alpha V^2 T \quad (7)$$

where α represents a constant and T is a characteristic update timescale. The various types of memristors 265 can be categorized as polar or non-polar in regards to their ability to change conductance as a function of the applied voltage and rectifying or non-rectifying as a function of their intrinsic (or not) diode properties. The method 300 can be applied to all such configurations, although various synaptic configurations (1-2, 2-1, 2-2) may need to be employed to achieve the AHaH rule. Furthermore, a mechanism for lowering the conductance of the device can be available, be it a reverse bias, application of high frequency AC voltage, or simply decay over time.

Figure 8:
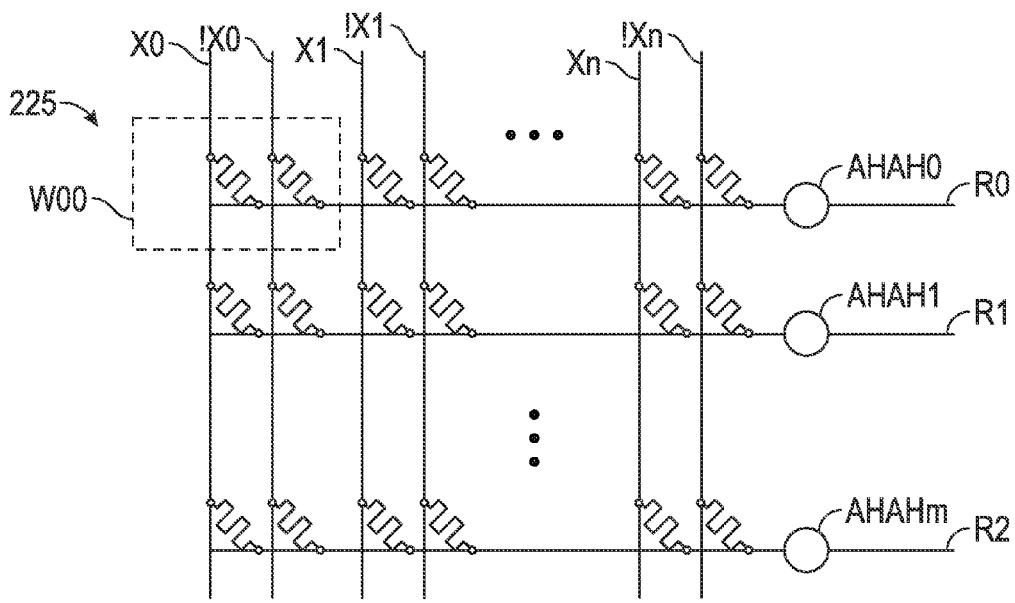
FIG. 8 illustrates a schematic view of AHaH nodes, in accordance with the disclosed embodiments.

FIG. 8 illustrates a schematic view of the AHaH nodes 240, in accordance with the disclosed embodiments. The AHaH node 240 is a collection of synapses 225 and associated CMOS feedback circuitry 270 acting on one of the three possible electrode configurations of 1-2, 2-1 or 2-2. For example, the 2-1 case can be illustrated below for non-rectifying polar memristor. The synapses 225 can be formed at the intersection of output and input electrodes. The synapse 225 is a differential pair of memristors 265 between the two output electrodes and one input electrode, as shown in FIG. 7. The node 240 can be formed from many such synapses 225 connecting many inputs to the node's electrode, as shown in FIG. 8.

Figure 9:
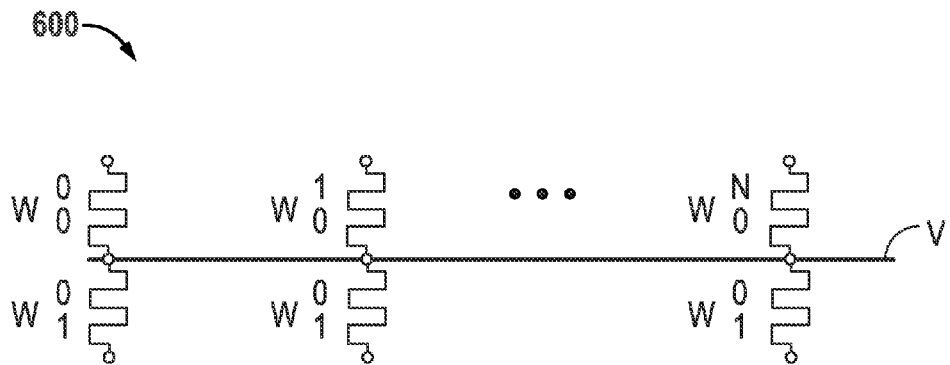
FIG. 9 illustrates a schematic view of an AHaH node that can be considered as a voltage divider prior to application of a feedback voltage, in accordance with the disclosed embodiments.

FIG. 9 illustrates a schematic view of an AHaH node 600 that can be considered as a voltage divider prior to application of a feedback voltage, in accordance with the disclosed embodiments. The node 600 can be recognized as a series of voltage-divider circuits formed from the input lines.

Figure 10:
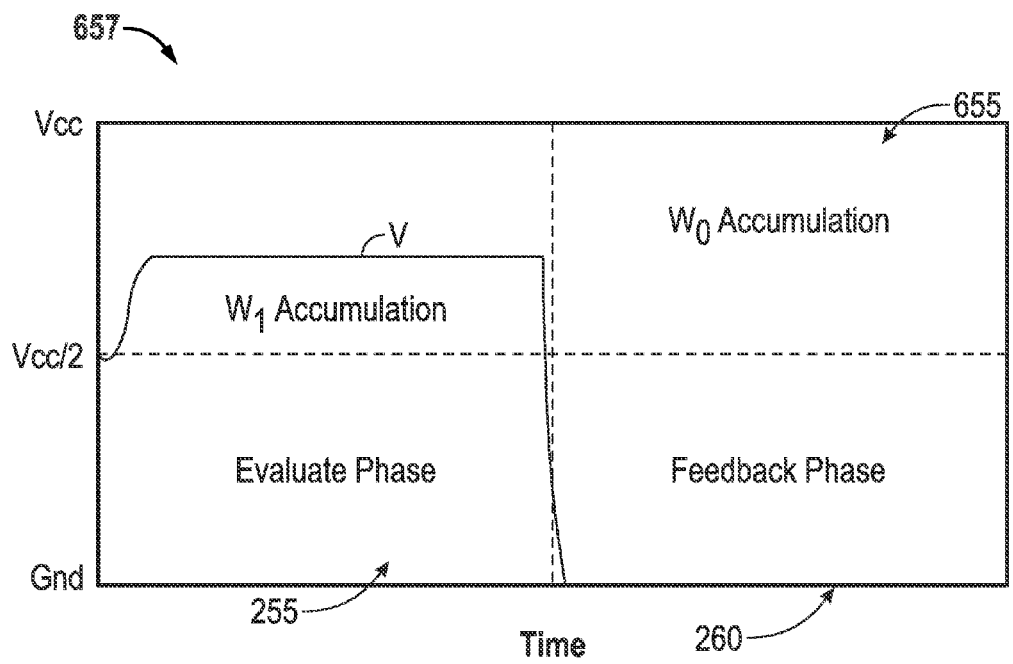
FIG. 10 illustrates a schematic view of a standard 2-1 AHaH circuit configuration, in accordance with the disclosed embodiments.
Figure 10:
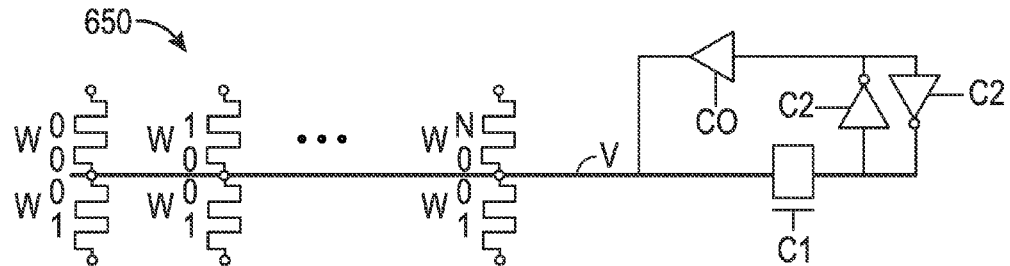

FIG. 10 illustrates a schematic view of a 2-1 AHaH circuit configuration 650 and a graph 657 thereof, in accordance with the disclosed embodiments. The AHaH rule 250 can be composed of two basic phases such as, for example, the evaluate phase 255 and the feedback phase 260 shown in graph 657. During the evaluate phase 255, the input voltages can be applied and these voltage are integrated via the differential synapses 225 on the nodes electrode. The evaluation phase 255 is a passive process and, in the case of the 2-1 configuration, consists of solving for the steady-state voltage. Note that during the evaluation phase 255, each synapse 225 undergoes negative feedback. For example, suppose the memristor is highly positive so that $w_o \gg w_1$. This will have the effect of pulling the electrode voltage (V in FIGS. 7 and 9) up, reducing the voltage drop across the $w_0$ memristor but increasing it over the $w_1$ memristor. This will cause $w_1$ to increase its conductance more than the $w_0$ memristor, thus moving the synapse 225 back toward the zero-point.

During the feedback phase 260, positive feedback can be applied to the electrode via a voltage-keeper circuit. During the feedback phase 260, the synapse 225 undergoes an update which is opposite in direction to that which it received during the evaluation phase 255, and it proceeds for a variable time as shown in FIG. 10, where the total weight update or accumulation for the $w_0$ memristor is shown as the shaded area 655. Note that the $w_0$ accumulation is less than the $w_1$ accumulation during the evaluate phase 255. For example, the operation of the device can be seen as a "memory read" and "memory refresh cycle", where the act of read (evaluate) damages the synaptic states, while feedback repairs the state.

Note that each memristor's conductance can saturate over time if not reduced. This can be accomplished by adding another phase in the cycle, by providing for a sufficiently long rest-state to allow the memristors 265 to decay, or to force the decay by applying an equal-magnitude reverse bias across both memristors 265 after a set or variable number of cycles. A synaptic normalization can be performed to decay the memristors 265 and to keep them operating within their dynamic range and to prevent saturation over time. As the dynamic range of the memristors 265 increases, the frequency of synaptic renormalization may be reduced.

The form of the plasticity rule 250 can be derived in the dissipative limit. Assume that the capacitance of the electrodes is negligible. Consider a node's input from N other nodes and solve for the steady-state voltage, V. The input voltages $x_i$ are binary values of ±1. Using Kirchhoff's current law, the sum of the currents on V must equal zero as illustrated in equation (8):

$$0 = \sum_i^N (V_{cc}x_i - V)w_i^0 - (V_{cc}x_i + V)w_i^1 \tag{8}$$

$$V = V_{cc} \frac{\sum_i^N x_i w_i^0 - x_i w_i^1}{\sum_i^N w_i^1 + w_i^0}$$

Due to the differential aspect of the synapse 225, if the $w_0$ memristor increases in conductance, then the conductance of $s_1$ will fall and vice versa, the result being that the denominator is constant over time as indicated in equation (9) as follows:

$$\sum_i^N w_i^1 + w_i^0 = \mu \tag{9}$$

The numerator can be rewritten in a more familiar vector form as illustrated below in equation (10).

$$\sum_i^N x_i w_i^0 - x_i w_i^1 = \sum_i^N x_i(w_i^0 - w_i^1) = \sum_i^N x_i W_i = \vec{W}\vec{X} \tag{10}$$

The familiar dot-product formulation can be defined by the following equation (11):

$$V = \frac{V_{cc}}{\mu} \vec{W}\vec{X} \tag{11}$$

Thus, during the evaluate phase 255 of the AHaH cycle, the voltage on the node input electrode can be written as the dot-product of the input vector and weight vector. The change in the memristor 265 is a function of the voltage across it and the time it is applied and over the course of the full AHaH cycle the value of the synapses is changed. To determine the functional form of this weight change the synaptic update can be broken into two components, one for the communicate phase and the other for the feedback phase 260. The modification of the synapse 225 can be found from the difference in change in of conductance of the k-memristor that compose it as indicated in equation (12) as follows:

$$\Delta W = \Delta w_0 - \Delta w_1 \tag{12}$$

The change of conductance in each memristor over the evaluate phase 255 can be written as shown in equation (13).

$$\Delta W = \Delta w_0 - \Delta w_1 = \alpha(V_{cc}x_i - V_y)^2 T - \alpha(V_y - V_{cc}(-x_i))^2 T$$

$$\Delta W = -4\alpha T x_i V_y \tag{13}$$

During the feedback phase 260, the feedback can be applied for a time period $T_p$, and the voltage across the memristor is either $2V_{cc}$ or 0, such that:

$$\Delta W_i = \alpha(2V_{cc})^2 T_p z - \alpha(2V_{cc})^2 T_p \bar{z} \tag{14}$$

$$\Delta W_i = 4V_{cc}^2 \alpha T_p(z - \bar{z})$$

$$z = \begin{cases} 1 & V \geq 0 \\ 0 & V < 0 \end{cases}$$

The individual updates over the evaluate and feedback phases 255 and 260 can be combined and the final form of the AHaH weight update, derived in the dissipative limit can be calculated, as shown in equation (15):

$$\Delta W_i = \begin{cases} \gamma(-X_i V + V_{cc}\beta) & V \geq 0 \\ \gamma(-X_i V - V_{cc}\beta) & V < 0 \end{cases} \tag{15}$$

where $\gamma = \alpha 4 V_{cc} T$, $$\beta = \frac{T_p}{T}.$$

The two fundamentally important properties to the AHaH rule 250 is that the rule transitions from Anti-Hebbian to Hebbian learning as a function of the feedback parameter β. Second, as the magnitude of the post-synaptic activation becomes large, the Hebbian portion of the update must decrease in magnitude or transition to Anti-Hebbian. The second property insures the rule converges to independent components.

Figure 11:
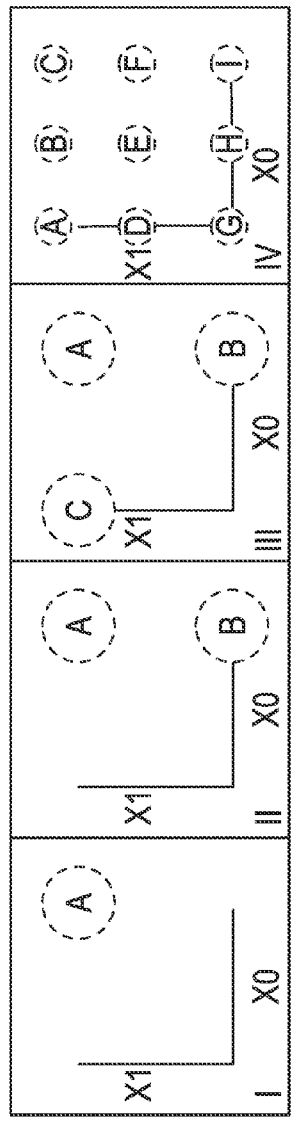
FIG. 11 illustrates a data structure of four different distributions on two wires x0 and x1, in accordance with the disclosed embodiments.

FIG. 11 illustrates a data structure 700 of four different distributions on two wires X0 and X1, in accordance with the disclosed embodiments. Two wires X0 and X1 carrying the same sequence of bits do not carry any additional information. Mutual information measures how much one signal tells about another signal. If the mutual information between wire A and wire B is 1, for example, they carry the same information. If the mutual information is zero, then they are independent. The number of states carried by the wires is in general unrelated to the number of wires that carry the information. For binary encodings, the total number of resolvable states over N wires is as high as $2^N$ but likely much lower. Unsupervised clustering or learning algorithms must resolve underlying states from observations over time and the wires that do not resolve more than one state are useless.

A temporal structure infers the existence of a source or mechanism in the environment since temporal events link cause and effect. The temporal sequence can be explained utilizing a model of a mechanism that generates the sequence. The sequence can be analyzed in a number of ways. For example, the sequence AA follows AB, BB follows AA, and AA follows AB, repeating in a cycle. On the other hand, the sequence ABAABB is simply repeating, or ABB follows ABA. The sequence can be viewed dependent on a temporal window the user 245 is capable of holding in memory, which leads to an important simplifying observation. Temporal structure can be converted into spatial structure when information travels through networks of path-delays.

Figure 12:
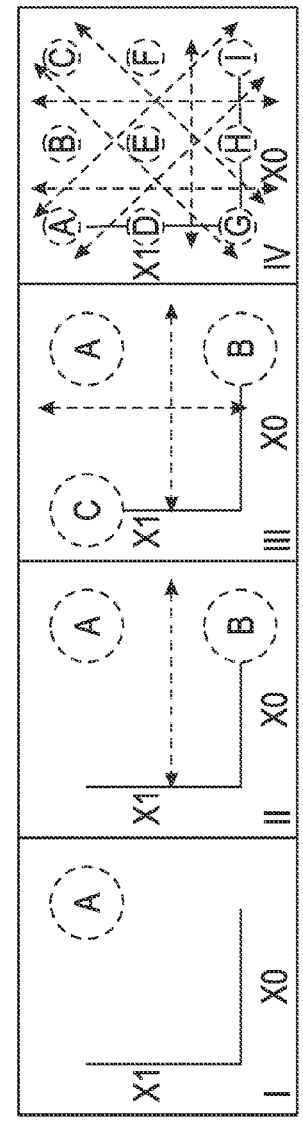
FIG. 12 illustrates a schematic view of an AHaH rule attractor points representing bifurcations of an input space, in accordance with the disclosed embodiments.

FIG. 12 illustrates a schematic view 750 of an AHaH rule attractor points representing bifurcations of an input space, in accordance with the disclosed embodiments. The AHaH node 240 partitions its input space as cleanly as possible. This can be seen easily if the decision boundary of each AHaH node 240 can be plotted with the data distributions that create it as shown in FIG. 12. If an input pattern falls on one side of the decision boundary, the output of the AHaH node 240 is positive, while it is negative if it is on the other side of the boundary. The node 240 output is an efficient binary encoding representing one natural independent component of the input data distribution. The AHaH node 240 only bifurcate its space and thus can only output a binary label. However, a collective of AHaH nodes 240 each occupying different attractor states can, as a group, distinguish each feature and assign unique labels.

Figure 13:
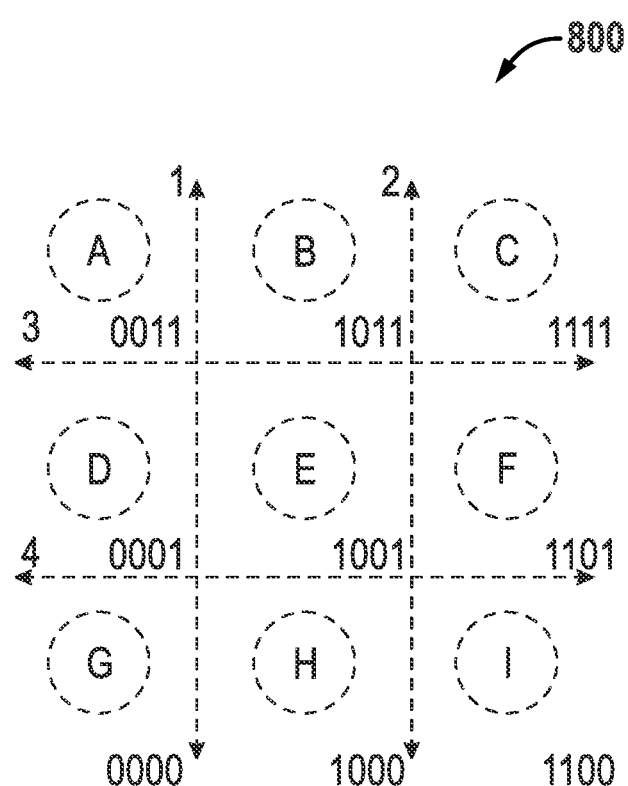
FIG. 13 illustrates a schematic view of a collective of AHaH nodes each occupying distinct attractor states to distinguish features, in accordance with the disclosed embodiments.

FIG. 13 illustrates a schematic view 800 of a collective of AHaH nodes 240 each occupying distinct attractor states to distinguish features, in accordance with the disclosed embodiments. For example, two input wires that carried a sequence of vectors that, over time, matched the distribution of IV in FIG. 12. These two inputs connect to four AHaH nodes, 1-4 as shown in FIG. 13. For the given input pattern, the output value of each node can read-off as a binary label which encodes each unique feature. Feature A gets the binary label 0011 because node 1 output is negative, 2 is negative, 3 is positive, and 4 is positive. In such a way, a collective of AHaH nodes 240 serves as a "partitioning" or "clustering" algorithm, outputting a unique binary label for each unique statistically independent input source, regardless of the number of input lines that carry the data.

Figure 14:
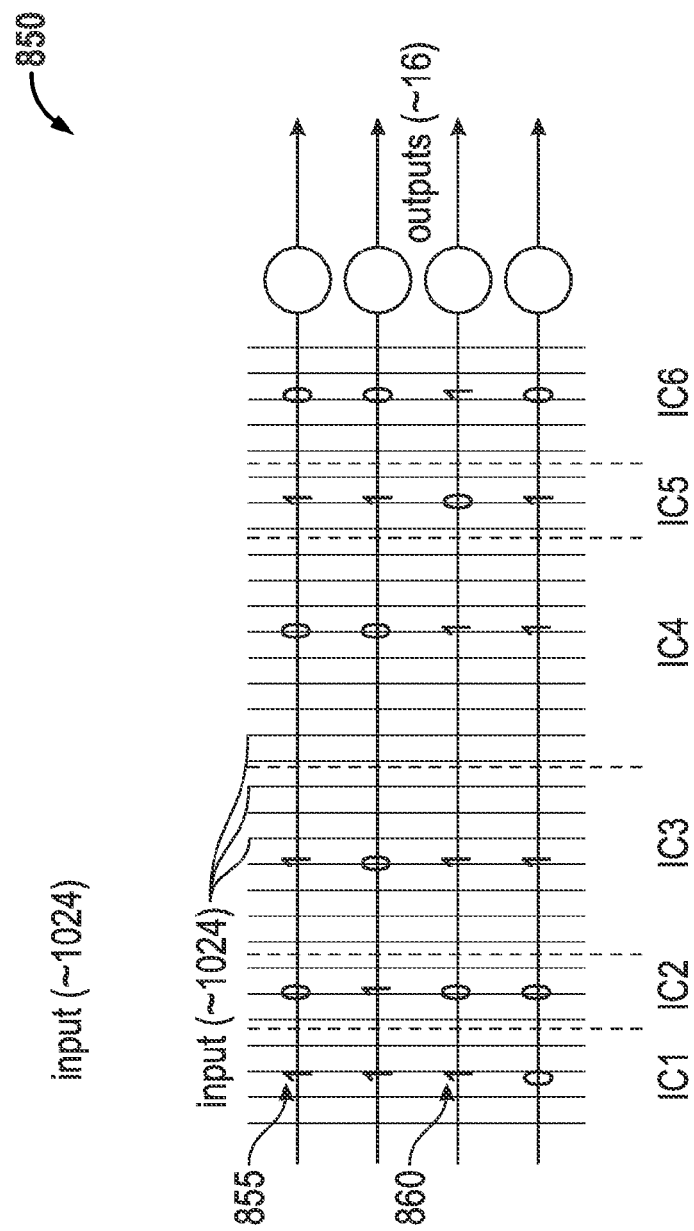
FIG. 14 illustrates a core operation of the collection of AHaH nodes, in accordance with the disclosed embodiments.

FIG. 14 illustrates a core operation 850 of the collection of AHaH nodes 240, in accordance with the disclosed embodiments. The core operation of the collective of AHaH nodes 240 is illustrated in FIG. 14. Many sparse binary (spiking) inputs synapse onto a small collection of AHaH nodes 240. Each temporally correlated group of inputs forms independent components (IC) and the AHaH rule 250 binds these inputs together by assigning them synapses of the same sign. For example, FIG. 14 depicts six IC's, with positive weights as indicated by arrows 855 and 860. The space of allowable AHaH states is $2^F$, where F represent the number of input features (i.e., patterns). To prevent occupation of the null state, a bias input which is always active and only ever receives anti-Hebbian updates can be included as illustrated below in equation (18):

$$y = \left( \sum_{i=0}^{N} w_i x_i \right) + x_{bias} w_{bias} \qquad (18)$$

$$\Delta w_i = \begin{cases} \gamma(-x_i V + V_{cc}\beta) & V \geq 0 \\ \gamma(-x_i V - V_{cc}\beta) & V < 0 \end{cases}$$

$$\Delta w_{bias} = -\gamma x_{bias} V$$

The feedback phase 260 can be omitted to achieve anti-Hebbian learning. In the case of 2-1 configurations, both bias differential inputs can be set to $$x_{bias} = \frac{V_{CC}}{2}$$

during the feedback cycle 260, or any other voltage, thus insuring that the weight update remains anti-Hebbian. The net effect is a subtraction of an adaptive average. If the node 240 finds an attractor state that splits its space in half, such that approximately half of the IC's are given positive weights and half are given negative weights, the average node output will be zero and the bias weight will be zero. If the output becomes unbalanced, the bias can bring it back, thus preventing the occupation of the null state.

Once each AHaH node 240 has settled into unique attractor states, the collective will output a binary label for each input feature, converting large, sparse, incomplete, noisy patterns into small, complete, noise-free binary patterns. The labels (L) can be generated for features (F). For example, presume that each AHaH node can randomly assign each IC to either the positive or negative state. The total number output labels is $2^N$, where N is the number of AHaH nodes 240. If N is small and the number of features high, it is possible that the AHaH node 240 collective will output the same label for different features. However, as the number of nodes increases, the probability of this occurring drops exponentially. Specifically, the probability P that any two features will be assigned the same binary label can be written as shown in equation (19).

$$P = \frac{1}{2^N} + \frac{2}{2^N} + \ldots + \frac{F}{2^N} = \frac{\sum_0^F i}{2^N} = \frac{F^2 + F}{2^{N+1}} \quad (19)$$

For 64 features and 16 nodes, the probability of two nodes being assigned the same label is 3%. Increasing N to 20 can reduce the probability of two nodes being assigned the same label to only 0.4% and with 32 nodes it is less than one in a million. For example, consider 16 nodes so that the output of the collective is a stable 16-bit pattern. Each of the 16 bit patterns represents a feature. Although the space of possible patterns is $2^{16}$, only a small subset will ever occur if the data is structured. However, far from noisy and incomplete, the bit patterns are stable and can therefore be matched exactly. A further reduction $_{from}$ 16 bits to, for example, 8 bits can be accomplished through the use of the content-addressable memory (CAM) 230. For a set of 256 patterns, the patterns can be stored as rows and new patterns can be matched bit-for-bit against new patterns.

Figure 15:
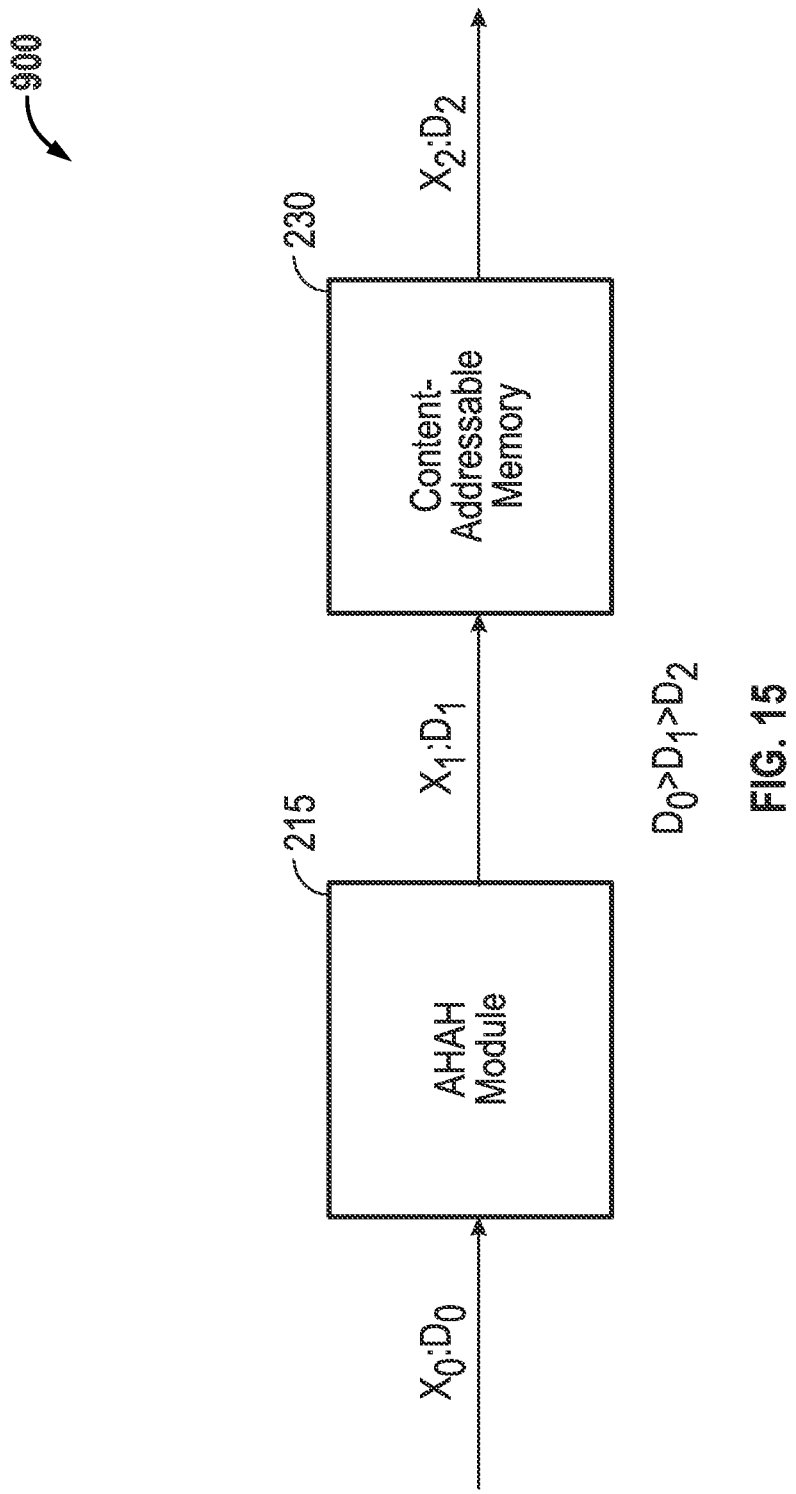
FIG. 15 illustrates a block diagram of the AHaH module and a content-addressable memory, in accordance with the disclosed embodiments.

FIG. 8 illustrates an array of M AHaH nodes ($AHAH_1$, $AHAH_2$, . . . , $AHAH_N$) receiving inputs from an array of inputs ($X_1, X_2, \ldots, X_N$) and producing an output on a register R with values ($R_1, R_2, \ldots, R_N$). The output of this register is a binary bit pattern of length M, which may feed into the CAM 230 to further reduce its dimension. FIG. 15 illustrates a block diagram of the AHaH module 215 and the content-addressable memory 230, in accordance with the disclosed embodiments. The AHaH module 215 provides an output, which is input to the CAM module 230. The noisy input $X_0$ in dimension $D_0$ can be reduced in dimensionality and conditioned to a stable bit pattern $X_1$ in dimension $D_1$, which is further reduced to a maximally efficient compact digital encoding in dimension $D_2$.

Based on the foregoing, it can be appreciated that a number of embodiments, preferred and alternative, are disclosed herein. For example, in a preferred embodiment, a feature extraction method is disclosed, which can include the steps or logical operations of presenting an input data stream to a synaptic matrix of a plurality of Anti-Hebbian and Hebbian nodes associated with an Anti-Hebbian and Hebbian module that operates a plasticity rule via an evaluate phase cycle and a feedback phase cycle; modulating a bias input line such that a bias weight does not receive a Hebbian portion of a weight update during said feedback phase in order to prevent occupation of a null state; partitioning an input space with respect to said input data stream when said plurality of Anti-Hebbian and Hebbian nodes falls randomly into an attractor state; and providing an output of said Anti-Hebbian and Hebbian module that forms a stable bit pattern as an input to a content-addressable memory for generating a maximally efficient binary label.

In another embodiment, the plurality of Anti-Hebbian and Hebbian nodes can include a plurality of synapses and a complementary metal-oxide-semiconductor feedback circuit acting on at least one electrode. In other embodiments, a step or logical operation can be implemented for applying an input voltage and integrating said input voltage via said plurality of synapses of said at least one electrode with respect to said Anti-Hebbian and Hebbian node so that each synapse among said plurality of synapses undergoes a negative feedback. In yet another embodiment, a step or logical operation can be implemented for applying a positive feedback to said at least one electrode via a voltage-keeper circuit to force at least one synapse among said plurality of synapses to experience said weight update, wherein said weight update is opposite to a direction received during said evaluation phase and proceeds accordingly for a variable time.

In still another embodiment, steps or logical operations can be implemented for performing a synaptic normalization to decay a memristor in order to operate said memristor within a dynamic range and to prevent saturation over time, and reducing a frequency of a synaptic renormalization as a dynamic range of said memristor increases.

In yet another embodiment, steps or logical operations can be implemented for spatial pooling of a plurality of input lines into a plurality of temporally independent components, collapsing said input space, and outputting a unique binary label for each unique statistically independent input source regardless of said plurality of input lines that carry data to thereby convert an incomplete and noisy pattern with respect to said input space into a complete and noise-free binary pattern.

In another embodiment, a feature extraction system can be implemented. Such a system can include, for example, a processor, a data bus coupled to said processor, and a computer-usable medium embodying computer code, said computer-usable medium being coupled to said data bus. The computer code can include instructions executable by said processor and configured, for example, for: presenting an input data stream to a synaptic matrix of a plurality of Anti-Hebbian and Hebbian nodes associated with an Anti-Hebbian and Hebbian module that operates a plasticity rule via an evaluate phase cycle and a feedback phase cycle; modulating a bias input line such that a bias weight does not receive a Hebbian portion of a weight update during said feedback phase in order to prevent occupation of a null state; partitioning an input space with respect to said input data stream when said plurality of Anti-Hebbian and Hebbian nodes falls randomly into an attractor state; and providing an output of said Anti-Hebbian and Hebbian module that forms a stable bit pattern as an input to a content-addressable memory for generating a maximally efficient binary label.

In some embodiments, the plurality of Anti-Hebbian and Hebbian nodes can include a plurality of synapses and a complementary metal-oxide-semiconductor feedback circuit acting on at least one electrode. In another embodiment, such instructions can be further configured for applying an input voltage and integrating said input voltage via said plurality of synapses of said at least one electrode with respect to said Anti-Hebbian and Hebbian node so that each synapse among said plurality of synapses undergoes a negative feedback. In another embodiment, such instructions can be further configured for applying a positive feedback to said at least one electrode via a voltage-keeper circuit to force at least one synapse among said plurality of synapses to experience said weight update, wherein said weight update is opposite to a direction received during said evaluation phase and proceeds accordingly for a variable time.

In still another embodiment, such instructions can be further configured for performing a synaptic normalization to decay a memristor in order to operate said memristor within a dynamic range and to prevent saturation over time, and reducing a frequency of a synaptic renormalization as a dynamic range of said memristor increases.

In other embodiments, such instructions can be further configured for performing spatial pooling of a plurality of input lines into a plurality of temporally independent components, collapsing said input space, and outputting a unique binary label for each unique statistically independent input source regardless of said plurality of input lines that carry data to thereby convert an incomplete and noisy pattern with respect to said input space into a complete and noise-free binary pattern.

In still another embodiment, a feature extraction system can be configured. Such a system can include a synaptic matrix of a plurality of Anti-Hebbian and Hebbian nodes associated with an Anti-Hebbian and Hebbian module that operates a plasticity rule via an evaluate phase cycle and a feedback phase cycle, wherein an input data stream is provided to said synaptic matrix of said plurality of Anti-Hebbian and Hebbian nodes associated with said Anti-Hebbian and Hebbian module; a bias input line that is modulated such that a bias weight does not receive a Hebbian portion of a weight update during said feedback phase in order to prevent occupation of a null state; an input space partitioned with respect to said input data stream when said plurality of Anti-Hebbian and Hebbian nodes falls randomly into an attractor state; and an output of said Anti-Hebbian and Hebbian module that forms a stable bit pattern as an input to a content-addressable memory for generating a maximally efficient binary label.

In another embodiment, the plurality of Anti-Hebbian and Hebbian nodes comprises a plurality of synapses and a complementary metal-oxide-semiconductor feedback circuit acting on at least one electrode. In yet another embodiment, an input voltage can be applied to and integrated via said plurality of synapses of said at least one electrode with respect to said Anti-Hebbian and Hebbian node so that each synapse among said plurality of synapses undergoes a negative feedback.

In other embodiments, such a system can include, for example, a voltage-keeper circuit and a positive feedback applied to said at least one electrode via said voltage-keeper circuit to force at least one synapse among said plurality of synapses to experience said weight update, wherein said weight update is opposite to a direction received during said evaluation phase and proceeds accordingly for a variable time. In still another embodiment, such a system can include a memristor, wherein a synaptic normalization is performed to decay said memristor in order to operate said memristor within a dynamic range and to prevent saturation over time; and a frequency of a synaptic renormalization is reduced as a dynamic range of said memristor increases.

In still other embodiments, such a system can include a plurality of input lines spatially pooled into a plurality of temporally independent components, wherein said input space is collapsed and wherein a unique binary label is output for each unique statistically independent input source regardless of said plurality of input lines that carry data to thereby convert an incomplete and noisy pattern with respect to said input space into a complete and noise-free binary pattern.

Thus, methods and systems for extracting features utilizing an AHaH (Anti-Hebbian and Hebbian) module are disclosed herein. An input data stream (e.g., a sparse input data stream) can be presented to a synaptic matrix of a collection of AHaH nodes associated with the AHaH module. The AHaH node operates an AHaH plasticity rule via an evaluate phase and a feedback phase cycle. A bias input line can be modulated such that a bias weight do not receive a Hebbian portion of the weight update during the feedback phase in order to prevent occupation of a null state. The input space can be bifurcated when the AHaH nodes fall randomly into an attractor state. The output of the AHaH module that forms a stable bit pattern can then be provided as an input to a content-addressable memory (CAM), Least-Recently Used Cache (LRUC), Least Frequently Used Cache (LFUC), Adaptive Cache, or other methods for dimensionality reduction of binary vectors.

An AHaH node can constitute in some embodiments a collection of synapses and associated Complementary Metal-Oxide-Semiconductor (CMOS) feedback circuitry acting on at least one of three possible electrode configurations, 1-2, 2-1, or 2-2. For example, a synapse is a differential pair of memristors between two output electrodes and one input electrode, which is the 1-2 configuration. Each node can be represented as a voltage divider operating over the space of its active inputs prior to application of a feedback voltage. During the evaluate phase, an input voltage can be applied to select inputs and the voltage can be integrated via the differential synapses on the nodes electrode. During the "read" phase, each synapse undergoes negative feedback.

During the feedback phase, positive feedback can be applied to either the pre- or post-synaptic electrode via a voltage-keeper circuit while the post- or pre-synaptic electrode potential is reversed. This is known as the Flip-Lock Cycle and it is used to apply positive feedback to the synaptic states. Thus, the AHaH rule can be understood as a two-part procedure of state evaluation that results in negative feedback to the synaptic state (Anti-Hebbian Learning) followed by state reinforcement that results in positive feedback to the synaptic state (Hebbian learning). Such methods are detailed in, for example, U.S. Pat. No. 7,599,895, which is incorporated herein by reference.

A synaptic normalization can be performed to decay the memristors in order to operate them within their dynamic range and to prevent saturation over time. The frequency of synaptic renormalization can be reduced as the dynamic range of the memristors increases. Depending on the physical attributes of the memristive devices used to construct the synapses, a number of techniques may be used. For example, if it is the case that a reverse bias will reduce the conductance of the devices, such a bias may be applied to speed up decay and hence synaptic normalization. Alternately, if the memristive devices are inherently volatile, it may be the case that a period of sleep or rest is sufficient to provide the necessary decay required for re-normalization of the differential synapses. This is the lowest-energy solution, although it requires extended periods of inactivity akin to sleep. In the case of memristive devices formed of colloidal particles, increased driving frequency may cause the transition from positive-Dielectrophoretic (attractive) to negative-Dielectrophoretic (repulsive) forces, thus speeding up decay.

The AHaH nodes perform spatial pooling of the input lines into temporally independent components (IC), collapsing the large input space and outputting the stable binary labels for input features regardless of the number of input lines that carry the data. Each temporally correlated group of inputs forms independent components and the AHaH rule binds these inputs together by assigning them synapses of similar sign. Once each AHaH node has settled into unique attractor states, the collective can output the binary label for each input feature, converting large, sparse, incomplete, noisy patterns into small, complete, noise-free binary patterns.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

The invention claimed is:

1. A feature extraction method, said method comprising:
   presenting an input data stream to a synaptic matrix of a plurality of Anti-Hebbian and Hebbian nodes associated with an Anti-Hebbian and Hebbian module that operates a plasticity rule via an evaluate phase cycle and a feedback phase cycle;

modulating a bias input line such that a bias weight does not receive a Hebbian portion of a weight update during said feedback phase in order to prevent occupation of a null state, which does not partition Anti-Hebbian and Hebbian inputs;

partitioning an input space with respect to said input data stream when said plurality of Anti-Hebbian and Hebbian nodes falls randomly into an attractor state; and providing an output of said Anti-Hebbian and Hebbian module that forms a stable bit pattern as an input to a content-addressable memory for generating a maximally efficient binary label.

2. The method of claim 1 wherein said plurality of Anti-Hebbian and Hebbian nodes comprises a plurality of synapses and a complementary metal-oxide-semiconductor feedback circuit acting on at least one electrode.

3. The method of claim 2 further comprising applying an input voltage and integrating said input voltage via said plurality of synapses of said at least one electrode with respect to said Anti-Hebbian and Hebbian node so that each synapse among said plurality of synapses undergoes a negative feedback.

4. The method of claim 1 further comprising applying a positive feedback to said at least one electrode via a voltage-keeper circuit to force at least one synapse among said plurality of synapses to experience said weight update, wherein said weight update is opposite to a direction received during said evaluation phase and proceeds accordingly for a variable time.

5. The method of claim 1 further comprising:
performing a synaptic normalization to decay a memristor in order to operate said memristor within a dynamic range and to prevent saturation over time; and
reducing a frequency of a synaptic renormalization as a dynamic range of said memristor increases.

6. The method of claim 1 further comprising:
spatial pooling of a plurality of input lines into a plurality of temporally independent components;
collapsing said input space; and
outputting a unique binary label for each unique statistically independent input source regardless of said plurality of input lines that carry data to thereby convert an incomplete and noisy pattern with respect to said input space into a complete and noise-free binary pattern.

7. A feature extraction system, said system comprising:
a processor;
a data bus coupled to said processor; and
a computer-usable medium embodying computer code, said computer-usable medium being coupled to said data bus, said computer code comprising instructions executable by said processor and configured for:
presenting an input data stream to a synaptic matrix of a plurality of Anti-Hebbian and Hebbian nodes associated with an Anti-Hebbian and Hebbian module that operates a plasticity rule via an evaluate phase cycle and a feedback phase cycle;
modulating a bias input line such that a bias weight does not receive a Hebbian portion of a weight update during said feedback phase in order to prevent occupation of a null state, which does not partition Anti-Hebbian and Hebbian inputs;
partitioning an input space with respect to said input data stream when said plurality of Anti-Hebbian and Hebbian nodes falls randomly into an attractor state; and
providing an output of said Anti-Hebbian and Hebbian module that forms a stable bit pattern as an input to a content-addressable memory for generating a maximally efficient binary label.

8. The system of claim 7 wherein said plurality of Anti-Hebbian and Hebbian nodes comprises a plurality of synapses and a complementary metal-oxide-semiconductor feedback circuit acting on at least one electrode.

9. The system of claim 8 wherein said instructions are further configured for applying an input voltage and integrating said input voltage via said plurality of synapses of said at least one electrode with respect to said Anti-Hebbian and Hebbian node so that each synapse among said plurality of synapses undergoes a negative feedback.

10. The system of claim 7 wherein said instructions are further configure for applying a positive feedback to said at least one electrode via a voltage-keeper circuit to force at least one synapse among said plurality of synapses to experience said weight update, wherein said weight update is opposite to a direction received during said evaluation phase and proceeds accordingly for a variable time.

11. The system of claim 7 wherein said instructions are further configured for:
performing a synaptic normalization to decay a memristor in order to operate said memristor within a dynamic range and to prevent saturation over time; and
reducing a frequency of a synaptic renormalization as a dynamic range of said memristor increases.

12. The system of claim 7 wherein said instructions are further configured for:
spatial pooling of a plurality of input lines into a plurality of temporally independent components;
collapsing said input space; and
outputting a unique binary label for each unique statistically independent input source regardless of said plurality of input lines that carry data to thereby convert an incomplete and noisy pattern with respect to said input space into a complete and noise-free binary pattern.

13. The system of claim 8 wherein said instructions are further configured for applying a positive feedback to said at least one electrode via a voltage-keeper circuit to force at least one synapse among said plurality of synapses to experience said weight update, wherein said weight update is opposite to a direction received during said evaluation phase and proceeds accordingly for a variable time.

14. The system of claim 11 wherein said instructions are further configured for:
performing spatial pooling of a plurality of input lines into a plurality of temporally independent components;
collapsing said input space; and
outputting a unique binary label for each unique statistically independent input source regardless of said plurality of input lines that carry data to thereby convert an incomplete and noisy pattern with respect to said input space into a complete and noise-free binary pattern.

15. A feature extraction system, said system comprising:
a synaptic matrix of a plurality of Anti-Hebbian and Hebbian nodes associated with an Anti-Hebbian and Hebbian module that operates a plasticity rule via an evaluate phase cycle and a feedback phase cycle, wherein an input data stream is provided to said synaptic matrix of said plurality of Anti-Hebbian and Hebbian nodes associated with said Anti-Hebbian and Hebbian module;
a bias input line that is modulated such that a bias weight does not receive a Hebbian portion of a weight update during said feedback phase in order to prevent occupation of a null state, which does not partition Anti-Hebbian and Hebbian inputs;

an input space partitioned with respect to said input data stream when said plurality of Anti-Hebbian and Hebbian nodes falls randomly into an attractor state; and an output of said Anti-Hebbian and Hebbian module that forms a stable bit pattern as an input to a content-addressable memory for generating a maximally efficient binary label.

16. The system of claim 15 wherein said plurality of Anti-Hebbian and Hebbian nodes comprises a plurality of synapses and a complementary metal-oxide-semiconductor feedback circuit acting on at least one electrode.

17. The system of claim 16 further comprising an input voltage applied to and integrated via said plurality of synapses of said at least one electrode with respect to said Anti-Hebbian and Hebbian node so that each synapse among said plurality of synapses undergoes a negative feedback.

18. The system of claim 15 further comprising:
a voltage-keeper circuit; and
a positive feedback applied to said at least one electrode via said voltage-keeper circuit to force at least one synapse among said plurality of synapses to experience said weight update, wherein said weight update is opposite to a direction received during said evaluation phase and proceeds accordingly for a variable time.

19. The system of claim 15 further comprising a memristor, wherein:
a synaptic normalization is performed to decay said memristor in order to operate said memristor within a dynamic range and to prevent saturation over time; and
a frequency of a synaptic renormalization is reduced as a dynamic range of said memristor increases.

20. The system of claim 15 further comprising a plurality of input lines spatially pooled into a plurality of temporally independent components, wherein said input space is collapsed and wherein a unique binary label is output for each unique statistically independent input source regardless of said plurality of input lines that carry data to thereby convert an incomplete and noisy pattern with respect to said input space into a complete and noise-free binary pattern.

* * * * *